United States Patent
Fleck et al.

(10) Patent No.: US 7,912,858 B2
(45) Date of Patent: Mar. 22, 2011

(54) DATA SYNCHRONIZATION METHOD

(75) Inventors: Andreas Fleck, Falkensee (DE); Jan Dehnel, Berlin (DE); Jan Hohndorf, Berlin (DE); Frank Mayr, Berlin (DE); Norbert Ahr, Stuttgart (DE)

(73) Assignee: Alcatel, Paris (FR)

( * ) Notice: Subject to any disclaimer, the term of this patent is extended or adjusted under 35 U.S.C. 154(b) by 284 days.

(21) Appl. No.: 11/059,477

(22) Filed: Feb. 17, 2005

(65) Prior Publication Data
US 2005/0210081 A1 Sep. 22, 2005

(30) Foreign Application Priority Data
Mar. 18, 2004 (EP) .................................. 04290733

(51) Int. Cl.
G06F 7/00 (2006.01)

(52) U.S. Cl. .......... 707/783; 707/999.009; 707/999.204; 379/201

(58) Field of Classification Search .................. 707/783, 707/999.009
See application file for complete search history.

(56) References Cited

U.S. PATENT DOCUMENTS

| | | | | |
|---|---|---|---|---|
| 5,317,568 A | * | 5/1994 | Bixby et al. ................... | 370/401 |
| 5,473,608 A | * | 12/1995 | Gagne et al. ................... | 370/401 |
| 5,517,622 A | * | 5/1996 | Ivanoff et al. ................. | 709/232 |
| 5,530,855 A | | 6/1996 | Satoh et al. ................... | 395/600 |
| 5,579,243 A | | 11/1996 | Seymour ....................... | 379/243 |
| 5,778,388 A | * | 7/1998 | Kawamura et al. ............ | 1/1 |
| 5,802,366 A | * | 9/1998 | Row et al. ..................... | 709/250 |
| 5,835,904 A | * | 11/1998 | Vicik et al. .................... | 1/1 |
| 5,838,683 A | * | 11/1998 | Corley et al. .................. | 370/408 |
| 5,896,441 A | | 4/1999 | Akazawa et al. .............. | 379/9 |
| 6,502,133 B1 | * | 12/2002 | Baulier et al. ................. | 709/224 |
| 7,290,056 B1 | * | 10/2007 | McLaughlin, Jr. ............ | 709/230 |
| 2002/0059299 A1 | * | 5/2002 | Spaey .......................... | 707/104.1 |
| 2002/0069192 A1 | * | 6/2002 | Aegerter ......................... | 707/1 |
| 2002/0107878 A1 | * | 8/2002 | Tsuchida et al. .............. | 707/204 |
| 2002/0116457 A1 | | 8/2002 | Eshleman et al. ............ | 709/203 |
| 2002/0156756 A1 | * | 10/2002 | Stanley et al. ................. | 706/47 |
| 2003/0078958 A1 | * | 4/2003 | Pace et al. ..................... | 709/201 |
| 2003/0212660 A1 | * | 11/2003 | Kerwin ............................ | 707/1 |

(Continued)

FOREIGN PATENT DOCUMENTS
EP 0 593 062 A2 4/1994

OTHER PUBLICATIONS
Kusaura N et al: "Distribution of service data to distributed SCPs in the advanced IN" Nov. 13, 1995, Global Telecommunications Conference, 1995. Conference Record. Communication Theory Mini-Conference, Globecom 1995., IEEE Singapore, Nov. 13-17, 1995, New York, NY, USA, IEEE, US, pp. 1272-1276, XP010164427.

(Continued)

*Primary Examiner* — Don Wong
*Assistant Examiner* — Shyue Jiunn Hwa
(74) *Attorney, Agent, or Firm* — Sughrue Mion, PLLC

(57) ABSTRACT

The invention concerns a method of synchronizing a distributed system comprising a server (2) having a master data base (21) and a set of clients (31 to 35) having respective client data bases (41 to 45), as well as a server and a computer program product for executing this method. The client data bases (41 to 45) are incrementally updated from the master-data base (21) of the server (2). A trace of transaction (22) is maintained at the server (2) for recovery. The server (2) synchronizes the client data bases (41 to 45) in case of a failure by coordinated rollback transactions from the trace (22).

25 Claims, 2 Drawing Sheets

U.S. PATENT DOCUMENTS

| | | | |
|---|---|---|---|
| 2004/0181510 A1* | 9/2004 | Jardin | 707/2 |
| 2005/0047350 A1* | 3/2005 | Kantor et al. | 370/254 |
| 2005/0207553 A1* | 9/2005 | Fleck et al. | 379/201.12 |
| 2006/0010441 A1* | 1/2006 | Jahn et al. | 718/100 |

OTHER PUBLICATIONS

Lautenschlager W et al Pinnacle Group: "Routing Service for the Provision of Number Protability." ISS 1997, World Telecommunications Congress. (International Switching Symposium). Global Network Evolution: Convergence or Collision? Toronto, Sep. 21-26, 1997, ISS. World Telecommunications Congress. (International Switching Symposium), Toronto, P, vol. vol. 2, Sep. 21, 1997, pp. 235-242, XP000704473.

U.S. Appl. No. 11/059,603, filed Feb. 17, 2005, entitled "Service Provisioning System."

* cited by examiner

DATA SYNCHRONIZATION METHOD

TECHNICAL FIELD

The invention relates to a method of synchronizing a distributed system comprising a server having a master-data base and a set of clients having respective client data bases, as well as a server and a computer program product for executing this method.

The invention is based on a priority application, EP 04290733.7, which is hereby incorporated by reference.

BACKGROUND OF THE INVENTION

Today's telecommunications systems provide a plurality of complexed routing services, for example number portability services, and enhanced services, as IN based information services (IN=Intelligent Network). The telecommunication systems consist of various network elements, for example exchanges, signaling transfer points, service switching points and service control points which are interacting to provide these services to subscribers of the telecommunication system. In such distributed system, service data has to be accessed by various network elements which use different platforms and different data base management systems to administrate their view of the service data. Further, the consistency of the distributed service data has to be kept in such heterogeneous distributed system to ensure a proper provision of the services.

In such environment it is a problem to keep the data of one or more remote data bases of network elements synchronous to one master-data base, where master-data base and remote data base are located on different platforms and using different data base management systems.

Caused by customer requirements it is often not possible in such environment to work with remote data base management systems or to store data on the remote system due to the fact that communication is only possible via different protocols. Further, the response time of the remote systems are often about some seconds. To apply a "2-phase" commit algorithm used to ensure the integrity of a committing transaction and sometimes provided by the data base management system is not possible since each data base uses a different data base management system and this functionality is not supported by the communication protocols.

SUMMARY OF THE INVENTION

It is the object of the present invention to provide an improved synchronization of a distributed system comprising a server having a master-data base and a set of clients having respective client data bases.

The object of the present invention is achieved by a method of synchronizing such distributed system, the method comprising the steps of: incrementally updating client data basics of the clients from the master-data base of the server; maintaining a trace of transaction at the server for recovery; and synchronizing the client data bases in case of a failure by coordinated rollback transactions from the trace. The object of the present invention is further achieved by a server for synchronizing such distributed system, the server having a master-data base, a communication unit for communicating with a set of clients having respective client data bases, and a control unit for incrementally updating client data bases of the clients from the master data base of the server, maintaining a trace of transactions for recovery, and synchronizing the client data bases in case of a failure by coordinated rollback transactions from the trace. The object of the present invention is further achieved by a computer program product for synchronizing such distributed system, the computer program product, when executed by the server, performs the steps of: incrementally updating client data bases of the clients from the master-data base of the server, maintaining a trace of transactions at the server for recovery, and synchronizing the client data base in case of a failure by coordinated rollback transactions from the trace.

The invention makes it possible to improve the performance and the throughput of the synchronization procedure compared with alternative approaches as long term replication transactions, workflow agents forcing distributed consistencies, lazy updates and incremental updates with locks. It becomes possible to already start the next transaction without waiting on the commitment of the previous transaction. The recovery responsibility is distributed between a mediator of the server and the clients. The mediator maintains a shallow copy of each replication transaction. In case of a failure detection the copy is used to enforce a distributed consistent rollback. The clients maintain the transaction properties within its respective view. This approach is well adapted to the specific constraints and requirements of a telecommunication system with a plurality of interacting network elements, wherein the response times of the remote systems are about some seconds and the use of a common data base management system is not possible due to the use of different platforms and different data base management systems at different network elements. Further, the invention integrates well in such existing telecommunication infrastructure. Therefore, the invention combines higher performance fail save robust operations with minimized integration costs.

Further advantages are achieved by the embodiments of the invention indicated by the dependent claims.

Preferably, the invention is applied to the synchronization of service data between a service provisioning system and various signaling transfer points, wherein the synchronization process implements number of portability functions within a telecommunication network. The telecommunication network has different network operators providing their services within the same area. To improve competitiveness between such providers, it is necessary that a subscriber may keep his telephone number when changing from one network operator to another network operator. Therefore, a fixed assignment of number ranges to network operator is not longer possible and exceptions, i.e. a change of a subscriber from one network operator to another network operator, has to be respected within the routing of the telecommunication network. To provide such functionality within a communication network, the routing tables of signaling transfer points of the telecommunication network are modified by the service provisioning system. The service provisioning system keeps a master-data base having the overview about the routing tables of the signaling transfer points. Each of the signaling transfer points has a client data base keeping the respective routing table and representing the view of the respective signaling transfer points. The invention is now applied to execute a change request requesting e.g. the portation of a specific subscriber from one network operator to another network operator. A master-data base of the service provisioning system is changed according to the update requests and the client data bases are incrementally updated according to this change request. The service provisioning system maintains a trace of these transactions and synchronizes the client data bases in case of a failure by coordinated rollback transactions from the trace.

According to a preferred embodiment of the invention, the server has a mediator which maintains a trace of transactions. When starting a new transaction, the mediator of the server is triggered for maintaining the trace. The mediator stores reference data of the transaction and related meta-information including rollback information and information which clients have to process data of the transaction. Preferably, the mediator stores these data in a persistence replication queue. That concept guarantees high performance, fail save and robust operations.

When all clients have confirmed the updates related to one request, a commit is done for the changes in the master database and the mediator(s) are informed about the final commit. Usually there is not transaction oriented interface to the clients but the clients can only perform each change request (e.g. command or CMISE operation; CMISE=Common Management Interaction Service Element) separately. Therefore in the replication queue for each request the actions to do as well as the actions to undo the changes in case of rollback are stored. A request in that sense means a list of change requests which shall be performed within one transaction, i.e. either completely perform all the changes or (if not possible) restore the situation as if no changed would have been done. When a rollback of a request becomes necessary for each operation of the request a client has performed until this time the corresponding undo change request (command or CMISE operation) has to be sent to the client. The latter task is performed by the mediator(s).

Further, the server preferably removes the data relating to a transaction from the replication queue, if all clients involved in the transaction have returned an acknowledgement message confirming the execution of the respective update of the respective client data base. For example, the mediator removes, after a final commitment, the data associated with the concerned request from the replication queue if all clients have confirmed the execution of all updates corresponding to the request. This approach reduces the memory space that has to be reserved within the server for maintaining a trace of transactions.

According to a preferred embodiment of the invention, the mediator sends a rollback message to all clients affected, if it detects a failure, e.g. a breakdown of the server, a breakdown of the client or a breakdown of the communication link between the server and the client. Such rollback message can consist of one or a set of single undo change request(s) (commands or CMISE operations) per action sent by the mediator to be undone for rollback of the request. In the following, the client undo the previous changes of the respective client data base indicated by the rollback message. But, it is also possible that the client keeps his own trace and the client uses the information of the rollback message as well as its own trace to undo the previous changes of its respective client data base.

Preferably, the server accesses the client data bases through associated client data base adapters running on the system platform of the server. Client data base adapters manage a replication of the respective client data base and access the persistence replication-queue storing reference data of consecutive transactions linked with related dedicated meta-data including rollback information and information which client has to process data of the respective transaction. From logical point of view the handling is like there would be one replication queue per client. Physically this replication queues have been compressed into one replication queue by adding a piece of information (bitmap) indicating for which clients a certain entry in the replication queue is valid. The informations in the replication queue are stored in a client independent manner and the said adapters perform the necessary adaptions related to the protocol of the interface to the client (including the command set) and/or the database system of the clients. This approach increases the throughput of the synchronization system as well as reduces the implementation costs necessary for implementing the link with the client data bases.

BRIEF DESCRIPTION OF THE DRAWINGS

These as well as further features and advantages of the invention will be better appreciated by reading the following detailed description of presently preferred exemplary embodiments taken in conjunction with accompanying drawings in which.

DETAILED DESCRIPTION OF THE INVENTION

Figure 1:
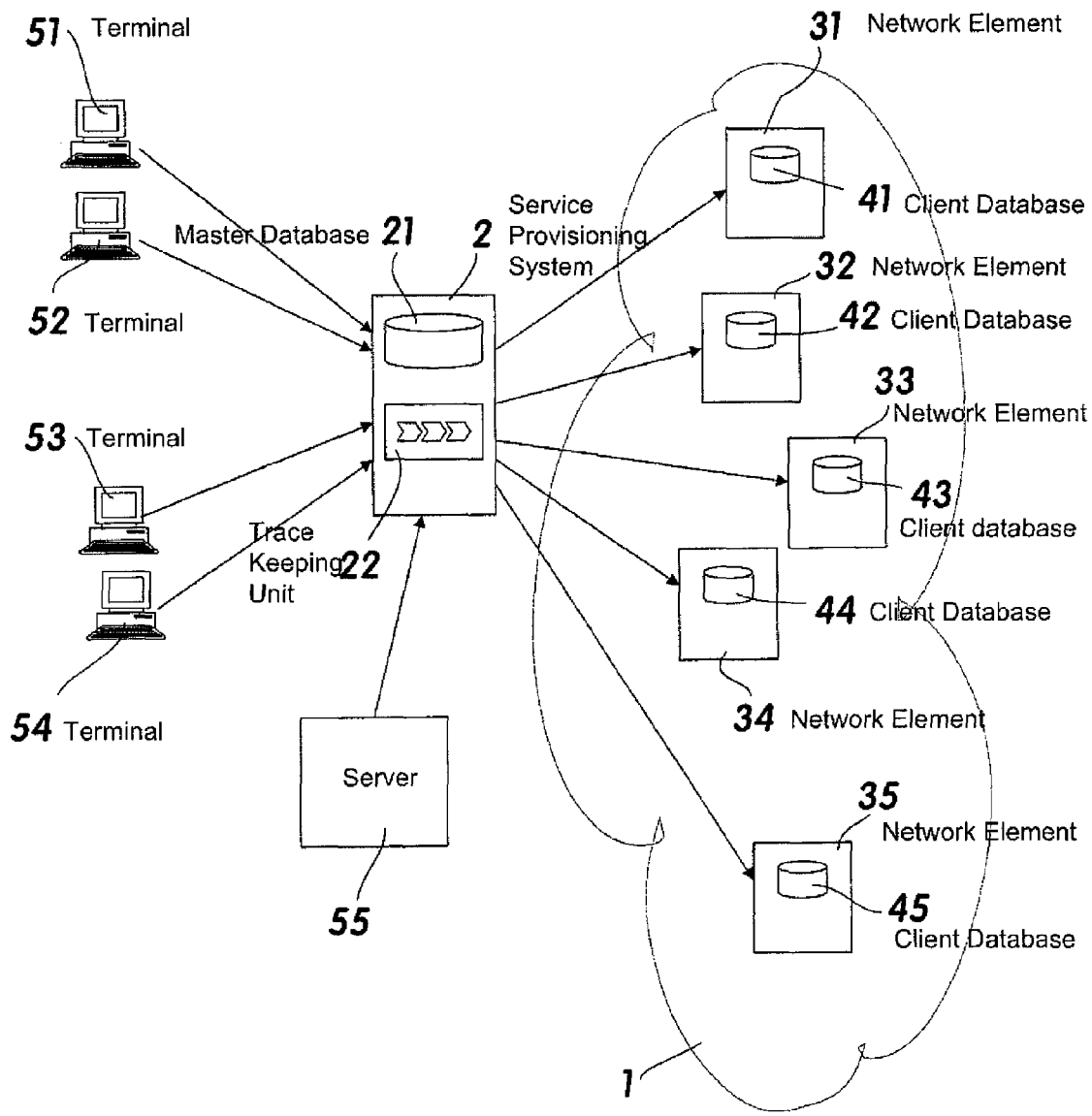
FIG. 1 is a block diagram showing a telecommunication system with a server for synchronizing a distributed system according to the present invention.

FIG. 1 shows a telecommunication system with various terminals 51 to 54, a server 55, a telecommunication network 1 and a service provisioning system 2.

The telecommunication network 1 is a telephone network, e.g. a PSTN or ISDN network (PSTN=Public Switched Telecommunication Network; ISDN=Integrated Services Digital Network). It is possible that the telecommunication network 1 is a mobile telecommunication network, for example according to the GSM or UMTS standard (GSM=Global System for Mobile Communication; UMTS=Universal Mobile Telecommunications System) or is a telecommunication network which provides mobile and fixed telecommunication services. The telecommunication network 1 may be operated by different competing network operators. Further, it is possible that the telecommunication network 1 is a data network or provides beside telephone services data and video transmission services.

The telecommunication network 1 is formed by a plurality of different network elements, e.g. exchanges, switches, routers, signaling transfer points, service control points and service switching points. FIG. 1 exemplary shows five network elements of these network elements, namely the network elements 31, 32, 33, 34 and 35.

According to the embodiment of FIG. 1, the network elements 31 to 35 are signaling transfer points of the telecommunication network 1. But, it is also possible that these network elements are constituted by a mixed set of different network elements of the telecommunication network 1.

Each of the network elements 31 to 35 has a respective data base 41, 42, 43, 44 and 45. These data bases store service data of the respective network elements that control the routing or service provisioning behavior of the respective network element. Preferably, the data bases 41 to 45 are managed by at least two different kinds of data base management systems, i.e. we have a heterogeneous data base management system environment.

The terminals 51 to 54 are operator terminals providing a human machine interface to agents of the network operators administrating the telecommunication network 1. For example, the terminals 51 to 54 are respectively formed by a computer linked via a local area network with the service provisioning system 2.

The server 55 exemplifies a server connected with the service provisioning system 2 via a data network, wherein the server 55 automatically generates and/or forwards change requests to the service provisioning system 2.

The service provisioning system 2 is constituted by one or several interlinked computers, a software platform and various application programs executed on the system platform formed by the hardware and software platform. The functionalities of the service provisioning system 2 are performed by the execution of these application programs on the system platform. The application programs controlling in such way the provisioning of the functionalities of the service provisioning system 2 forms as such or stored on a computer readable storage medium a computer program product for synchronizing a distributed system.

From functional point of view, the service provisioning system 2 has a master data base 21 and a trace keeping unit 22. It plays a server role with regard to the network elements 31 to 35 which plays a client role.

The service provisioning system 2 receives from the terminals 51 to 54 and from the server 55 change requests requesting the update of service data which are relevant for network element of the telecommunication network 1. The service provisioning system 2 keeps in its master-data base 21 an overview of the service data stored in the data bases 41 to 45 of the network elements 31 to 35. According to the received change requests, the service provisioning system incrementally updating its master-data base 21 and, in parallel, incrementally updating client data bases of the network elements 31 to 35 effected by the respective change of master data base 21. When starting a new transaction, the service provisioning system 2 stores the data of the transaction in the master-data base, determines the potential clients of the transaction and contacts the respective ones of the network elements 31 to 35 for updating their respective client data base. Further, it maintains a trace of transactions for recovery. For example, it stores reference data of the transaction and related information including rollback information and information which clients have to process the data of the transactions within the trace keeping unit 22.

When having successfully executed the respective update of the respective client data base, the network elements 31 to 35 confirms this execution towards the service provisioning system 2 by returning a corresponding acknowledgment message. The service provisioning system 2 checks, whether all of the network elements contacted for a transaction return such acknowledgment messages. If it detects that all clients involved in the transaction have returned such acknowledgement message, it removes the data relating to the transaction from the trace keeping unit 22. Further, it commits the change in the master-data base. In case it detects a failure, for example a breakdown of the service provisioning system 2 or a breakdown of one of the involved network elements, it sends one or a set of undo change requests to all clients affected to undo the previous changes of their respective client data bases. The breakdown of one of the network elements 31 to 35 is for example detected by a watch-dog-timer checking the response time of the acknowledgment messages expected from the involved network elements.

Due to the above-specified mechanism, it is possible to execute further changes in the master-data base 21 and in the client data bases 41 to 45 without waiting on such final confirmation. Since the response time of the network elements 31 to 35 is in the range of some seconds, a plurality of subsequent change requests may already be executed in the master-data base 21 and in the client data bases 41 to 45, before the execution of the first exchange is finally committed by the system. But, it is still possible to keep the consistency of the distributed system in case of a failure.

In the following, details of the service provisioning system 2 are exemplified by means of FIG. 2.

Figure 2:
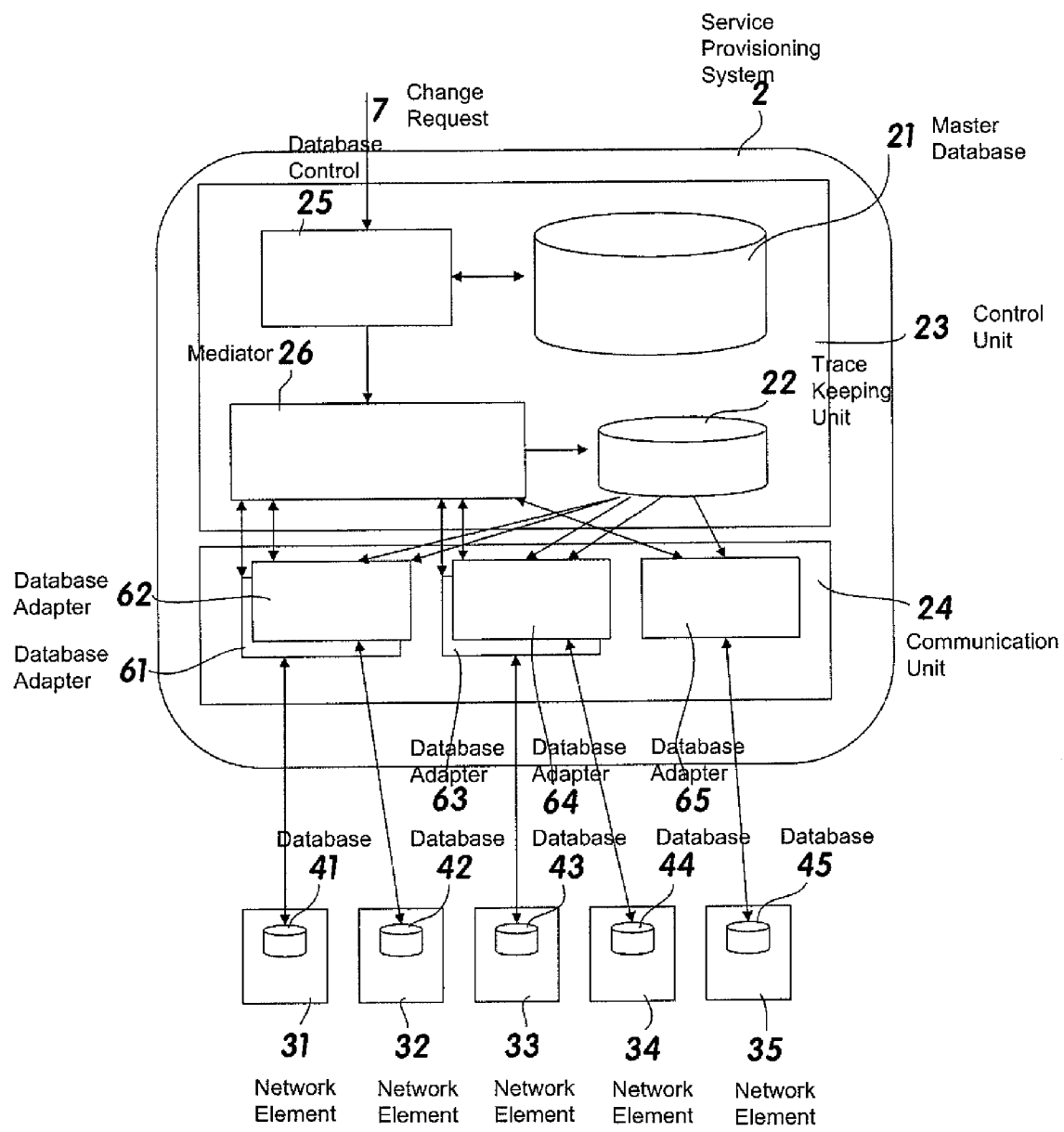
FIG. 2 shows a block diagram of the server of FIG. 1.

FIG. 2 shows the service provisioning system 2 and the network elements 31 to 35 with the data bases 41 to 45. From functional point of view, the service provisioning system 2 has a control unit 23 and a communication unit 24.

The communication unit 24 comprises the necessary functionalities for communicating with the network elements 31 to 35. For example, the communication unit 24 comprises functionalities for executing the necessary communication protocols, for example the OSI protocol stack or the TCP/IP protocol stack (TCP=Transmission Control Protocol, IP=Internet Protocol). Further, the communication unit 24 comprises data base adapters 61 to 65 that comprise the necessary functionalities for remotely accessing data of the data bases 41 to 45. The data bases 41 to 45 are managed by different data base management systems. For example, the data bases 41 and 42 are managed by a first kind of data base management system, the data bases 43 and 44 are managed by a second kind of data base management system and the data base 45 is managed by a third kind of data base management system. The data base adapter 61 provides a remote access to the data base 41 of the network element 31 and the data base adapter 62 provides a remote access to the data base 42 of the network element 32, wherein the data base 41 and 42 are both managed by the same kind of data base management system. The data base adapters 63 and 64 provide remote access to the data bases 43 and 44 of the network elements 33 and 34, respectively, wherein the data bases 43 and 44 are managed by the same kind of data base management system. The data base adapter 65 provides a remote access to the data base 45 of the network element 35.

The control unit 23 comprises a mediator 26, a data base control 25, the master-data base 21 and the trace keeping unit 22 storing a persistent replication queue.

The data base controller 25 receives change requests from the terminals 51 to 54 and from the server 55. For example, the data base controller 25 receives the change request 7.

When receiving the change request 7, the data base controller 25 starts a new transaction and writes the data specified in the change request into the master data base 21. Further, it determines the potential clients of the transaction and the respective client data changes by means of the data stored in the master data base 21. When starting the new transaction, the data base controller 25 further triggers the mediator 26.

The mediator 26 stores reference data of the transaction together with rollback information and the information which client has to process this data in the persistence replication queue of the trace keeping unit 22 and contacts the potential client of the transaction. For example, it contacts the data base adapters 61, 62, 63, 64 and 65 and specifies the requested update of the respective client data base towards these data base adapters.

The data base adapters 61 to 65 sends the data to its network element to get the result of the respective remote data base management system handling the respective client data base 41, 42, 43, 44 and 45. This can take several seconds. If the update of the respective remote data base was successful or if the network element was not responding, the data base adapter returns a kind of OK-message, i.e. data was not rejected by the network element, otherwise it returns a NOK-message, i.e. data has been rejected by network element.

The further behavior of the control unit 23 depends on the messages received from the clients.

If one of the clients has responded a NOK-Message to the mediator 26, the data base adapters 61 to 65 performs a rollback on its respective data base. The mediator 26 sends rollback messages to all clients, to trigger this procedure. The data base adapters 61 to 65 use the rollback information from the replication queue of the trace keeping unit 22 to undo all previous changes.

If all clients have responded an OK-message to the mediator 26, the data base adapters 61 to 65 commit the changes in the master-data base 21. If this was successful, the mediator 26 sends a final commitment to all data base adaptors involved to clear theirs resources. The adaptors will then clear their resources related to the concerned transaction. Furthermore the entry in the persistent replication queue will be deleted when all clients have responded an ok message.

If a client has responded that he was unable to deliver the data, the mediator 26 updates all the meta-information in the replication queue of the trace keeping unit 22 and keeps the reference data. Otherwise, the whole entry is deleted. If a client reestablishes the connections to the network element later, the data base adapter can send the data from the persistent replication queue to the network element. After the successful update of the client data base of the respective network element, the data base adapter checks the meta-information concerning the point whether it was the last client of all this data. If it was the last one, the data base adapter removes the data from the replication queue of the trace keeping unit 22. Otherwise, it modifies only the meta-information.

If a failure occurs during the commitment of the master data base, a rollback message is sent to the clients like in the case specified above.

Due to the long transfer time of the requests from the data base adapters 61 to 65 to the network elements 31 to 35, it is possible that the system or a single module of the system is going down during one transaction. To prevent inconsistencies caused by the shut-down, different approaches may be used to resynchronizes the master-data base 21 and the client data bases 41 to 45 during startup of each module:

In case the whole system falls down following steps are performed:

The changes in the master-data base 21 are rolled back by help of the data base management system of the master-data base 21. If the mediator detects an unfinished request in the replication-queue, it sends rollback messages to all affected clients and the clients undo the changes of the requests in the client data bases 41 to 45.

In case, one or all of the data base adapters 61 to 65 were down, following steps are performed:

If the respective data base adapter detects unfinished requests in the data base, the data base adapter queries the dedicated client data base to detect which changes have already been done. Then, the data base adapter finishes the request.

The invention claimed is:

1. A method of synchronizing a distributed system comprising a server having a master data base and a set of clients having respective client data bases the method comprising:
    receiving a change request to update data;
    updating data stored in the master corresponding to the received change request;
    determining potential client data bases affected by the updated data stored in the master;
    incrementally updating in parallel, data stored in the determined potential client data bases of the clients based on the data stored in the master data base of the server;
    maintaining a trace of transactions at the server for recovery; and
    synchronizing the data stored in the client data bases in case of a failure by coordinated rollback transactions from the trace at the server,
    wherein each client in the set of clients has a corresponding client data base,
    wherein the data stored in at least one of the client data bases is different from data stored in another one of the client,
    wherein the client of the distributed system are managed by at least two different types of management systems,
    wherein the at least two different types of management systems administrate their respective view of service data,
    wherein a mediator stores information about which client has to process data of the respective transaction in a replication queue, and
    wherein the master data base and the remote client data bases are located on different platforms.

2. The method of claim 1, further comprising
    triggering, when starting a new transaction, the mediator of the server for maintaining the trace of the transaction; and
    storing, by the mediator, reference data of the transaction and related meta-information including rollback information.

3. The method of claim 2, wherein the mediator stores reference data of consecutive transactions linked with related dedicated meta-data including the rollback information in the replication queue.

4. The method of claim 3, wherein the server removes the data relating to the transaction from the replication queue if all clients involved in the transaction have returned an acknowledgment message confirming execution of the respective update of the respective client data base.

5. The method of claim 3, wherein, in case of a failure, the mediator sends a rollback message to all clients affected and the clients use the rollback information from the replication queue to undo previous changes of their respective client data bases.

6. The method of claim 1, wherein the server stores, when starting a new transaction, data of the transaction in the master data base, determines the potential clients of the transaction and contacts the potential clients for updating the data stored in the client data bases of the potential clients.

7. The method of claim 6, wherein the server sends a final commitment of an update to clients involved in a transaction if all the clients involved in the transaction have returned an acknowledgment message confirming execution of the respective update of the respective client data base.

8. The method of claim 1, further comprising:
    accessing the data stored in the client data bases through associated client data base adapters of the server, the client data base adapters manage a replication-queue of a respective client data base.

9. The method of claim 1, wherein
    the data stored in the client data bases are synchronized with each other.

10. The method of claim 1, wherein
    the change request is received from the server to update data and the data comprises the service data which are relevant to the clients.

11. The method of claim 1, wherein
    the change request is received from at least one terminal to update data and the data comprises the service data which are relevant to the clients.

12. The method of claim 11, wherein the terminals are operating terminals providing a human interface.

13. The method of claim 1, further comprising:
    checking whether all of client data bases contacted for the transactions return an acknowledgement message;

removing the trace of the transaction at the server and committing changes in the master data base, if it is determined that all the clients involved in the transaction have returned the acknowledgement message; and sending a set of undo change request to all the clients affected to undo present changes of their respective client data bases, if it is determined that there is a break down involving at least one of the client data bases.

14. The method of claim 13, wherein the breakdown involving the at least one of the client data bases is detected by a watch-dog-timer checking a response time of the acknowledgement messages expected from the involved client data bases.

15. The method of claim 1, wherein the data stored in the determined potential client data bases of the clients are updated at the same time.

16. The method of claim 1, wherein the master data base and the client, use different data base management systems.

17. The method of claim 1, wherein the clients are network elements of a telecommunication network and wherein the network elements are at least one of exchanges, routers, switches, signaling transfer points, service control points, and service switching points.

18. The method of claim 17, wherein the client data bases store the service data for the respective network elements that control at least one of routing and service provisioning behavior of the respective network element.

19. The method of claim 1, wherein a first client among the client is managed by a first type of management system and a second client data base among the client is managed by a second type of management systems and wherein the determined potential client data bases comprise the first client and the second client.

20. A server for synchronizing a distributed system, the server comprising:
a processor;
a master data base;
a communication unit which communicates with a set of clients having respective client data bases; and
a control unit which
receives a change request to update data;
updates data stored in the master corresponding to the received change request;
determines potential client data bases affected by the updated data stored in the master;
incrementally updates in parallel, data stored in the determined potential client data bases of the clients based on data stored in the master data base of the server,
maintains a trace of transactions for recovery, and
synchronizes the data stored in the client data bases in case of a failure by coordinated rollback transactions from the trace at the server,
wherein each client in the set of clients has a corresponding client data base,
wherein the data stored in at least one of the client data bases is different from data stored in another one of the client,
wherein the client of the distributed system are managed by at least two different types of is a management systems,
wherein the at least two different types of management systems administrate their respective view of service data, and
wherein a mediator stores information about which client has to process data of the respective transaction in a replication queue, and
wherein the master data base and the remote client data bases are located on different platforms.

21. The server of claim 20, wherein
the data stored in the client data bases are synchronized with each other.

22. The server of claim 20, wherein
the distributed system comprises a set of signaling transfer points of a telecommunication network.

23. A computer program product for synchronizing a distributed system, the computer program product comprising a server having a master-data base and a set of clients having respective client data bases, wherein the computer program product, when executed by a processor the server, performs the operations of:
receiving a change request to update data;
updating data stored in the master corresponding to the received change request;
determining potential client data bases affected by the updated data stored in the master;
incrementally updating in parallel, data stored in the determined potential client data bases of the clients based on data stored in the master data base of the server;
maintaining a trace of transactions at the server for recovery; and
synchronizing the data stored in the client data bases in case of a failure by coordinated rollback transactions from the trace at the server,
wherein each client in the set of clients has a corresponding client data base,
wherein the data stored in at least one of the client data bases is different from data stored in another one of the client,
wherein the client of the distributed system are managed by at least two different types of management systems, and
wherein the at least two different types of management systems administrate their respective view of service data, and
wherein a mediator stores information about which client has to process data of the respective transaction in a replication queue, and
wherein the master data base and the remote client data bases are located on different platforms.

24. The computer program product of claim 23, wherein the data stored in the client data bases are synchronized with each other.

25. The computer program product of claim 23, wherein the distributed system comprises a set of signaling transfer points of a telecommunication network.

* * * * *